US00RE41258E

(19) United States
(12) Reissued Patent
Mauer et al.

(10) Patent Number: US RE41,258 E
(45) Date of Reissued Patent: Apr. 27, 2010

(54) SELF-PIERCING RIVET, PROCESS AND DEVICE FOR SETTING A RIVET ELEMENT, AND EMPLOYMENT THEREOF

(75) Inventors: Dieter Mauer, Lollar (DE); Reinhold Opper, Busek (DE)

(73) Assignee: Newfrey LLC, Newark, DE (US)

(21) Appl. No.: 12/150,344

(22) Filed: Apr. 25, 2008

Related U.S. Patent Documents

Reissue of:
(64) Patent No.: 7,040,006
Issued: May 9, 2006
Appl. No.: 10/657,411
Filed: Sep. 8, 2003

U.S. Applications:
(63) Continuation of application No. PCT/DE02/00764, filed on Mar. 1, 2002.

(30) Foreign Application Priority Data

| | | |
|---|---|---|
| Mar. 9, 2001 | (DE) | 101 11 692 |
| Apr. 30, 2001 | (DE) | 101 21 218 |
| Dec. 11, 2001 | (DE) | 101 60 771 |

(51) Int. Cl.
*B23Q 15/00* (2006.01)
*B23P 19/00* (2006.01)

(52) U.S. Cl. ..... 29/716; 29/798; 29/432; 29/407.08

(58) Field of Classification Search ..... 29/407.08, 29/432, 432.1, 522.1, 524.1, 525.05, 525.06, 29/525.08, 525.11, 716, 798, 243.53; 72/373, 72/470; 403/279, 280, 283
See application file for complete search history.

(56) References Cited

U.S. PATENT DOCUMENTS

| | | | | |
|---|---|---|---|---|
| 2,148,977 A | | 2/1939 | Buck | |
| 2,188,422 A | | 1/1940 | Waner | |
| 2,369,670 A | | 2/1945 | Gookin | |
| 2,392,133 A | | 1/1946 | Eklund | |
| 2,588,907 A | | 3/1952 | Colley | |
| 2,803,984 A | | 8/1957 | Swenson | |
| 2,887,926 A | | 5/1959 | Edwards | |
| 3,030,705 A | | 4/1962 | Gill | |
| 3,263,250 A | | 8/1966 | Vaughn | |
| 3,403,593 A | | 10/1968 | Moore | |
| 3,463,046 A | * | 8/1969 | Wendt et al. | 411/34 |
| 3,477,336 A | | 11/1969 | Thorpe | |

(Continued)

FOREIGN PATENT DOCUMENTS

| | | |
|---|---|---|
| DE | 26547118 | 6/1978 |
| DE | 2739166 | 3/1979 |
| DE | 1625359 | 6/1979 |
| DE | 3744450 | 10/1989 |
| DE | 19816198 | 10/1999 |
| EP | 0351715 | 1/1990 |
| FR | 1300424 | 6/1962 |

*Primary Examiner*—Jermie E Cozart
(74) *Attorney, Agent, or Firm*—Harness, Dickey & Pierce, P.L.C.

(57) ABSTRACT

A fastening element (1), in particular for blind riveting, has a setting head (4), a deformation segment (2) and a shank end (3). The deformation segment (2) is arranged between the setting head (4) and the shank end (3). The fastening element (1) is hollow, optionally having a mandrel (7) inside the fastening element (1). The mandrel includes a head (23) and a foot (24) at least tension-resistantly connected to the shank end (3). The shank end (3) includes a punching edge (6) extending substantially along the outermost periphery of the shank end (3). Also identified are a process for setting the fastening element (1), a riveted connection to the fastening element (1), a device for setting the fastening element (1), an employment of the riveted connection obtained, and a die suitable for setting the fastening element (1).

48 Claims, 6 Drawing Sheets

U.S. PATENT DOCUMENTS

| | | | | |
|---|---|---|---|---|
| 3,659,449 | A | | 5/1972 | Abernathy |
| 3,906,776 | A | | 9/1975 | Humphreys et al. |
| 3,909,913 | A | | 10/1975 | Tildesley |
| 3,971,116 | A | | 7/1976 | Goodsmith et al. |
| 4,130,922 | A | | 12/1978 | Koett |
| 4,178,669 | A | | 12/1979 | Hara et al. |
| 4,307,598 | A | | 12/1981 | Andrich |
| 4,404,742 | A | | 9/1983 | Fuhrmeister |
| 4,499,647 | A | | 2/1985 | Sakamura et al. |
| 4,781,500 | A | | 11/1988 | Mauer |
| 4,836,728 | A | | 6/1989 | Mauer et al. |
| 5,066,446 | A | | 11/1991 | Phillips, II |
| 5,110,029 | A | | 5/1992 | Blake |
| 5,125,151 | A | | 6/1992 | Smart |
| 5,167,585 | A | | 12/1992 | Williams |
| 5,237,733 | A | | 8/1993 | Ladouceur et al. |
| 5,259,713 | A | | 11/1993 | Renner et al. |
| 5,323,946 | A | | 6/1994 | O'Connor et al. |
| 5,337,463 | A | | 8/1994 | Rossler et al. |
| 5,403,135 | A | | 4/1995 | Renner et al. |
| 5,469,610 | A | | 11/1995 | Courian et al. |
| 5,490,312 | A | | 2/1996 | Smith |
| 5,502,888 | A | | 4/1996 | Takahashi et al. |
| 5,600,878 | A | | 2/1997 | Byrne et al. |
| 5,645,383 | A | | 7/1997 | Williams |
| 5,658,107 | A | | 8/1997 | Smith |
| 5,661,887 | A | | 9/1997 | Byrne et al. |
| 5,666,710 | A | | 9/1997 | Weber et al. |
| 5,727,302 | A | | 3/1998 | Sawdon |
| 5,759,001 | A | | 6/1998 | Smith |
| 5,960,667 | A | | 10/1999 | Hylwa et al. |
| 6,032,510 | A | | 3/2000 | Smith et al. |
| 6,115,900 | A | | 9/2000 | Cerulo et al. |
| 6,224,310 | B1 | | 5/2001 | Summerlin et al. |
| 6,254,324 | B1 | | 7/2001 | Smith et al. |
| 6,398,472 | B1 | | 6/2002 | Jones |
| 6,418,599 | B2 | | 7/2002 | Suzuki et al. |
| 6,428,255 | B1 | | 8/2002 | Smith |
| 6,487,767 | B1 | * | 12/2002 | Reid et al. ..... 29/522.1 |
| 6,502,008 | B2 | | 12/2002 | Mauer et al. |
| 6,742,420 | B2 | | 6/2004 | Aldama |
| 6,826,820 | B2 | | 12/2004 | Denham et al. |
| 2004/0107557 | A1 | | 6/2004 | Morris et al. |

* cited by examiner

SELF-PIERCING RIVET, PROCESS AND DEVICE FOR SETTING A RIVET ELEMENT, AND EMPLOYMENT THEREOF

Matter enclosed in heavy brackets [ ] appears in the original patent but forms no part of this reissue specification; matter printed in italics indicates the additions made by reissue.

CROSS-REFERENCE TO RELATED APPLICATIONS

This application is a *Re-issue of U.S. Pat. No. 7,040,006, issued on May 9, 2006, which is a* Continuation of International Application No. PCT/DE02/00764, filed Mar. 1, 2002[. This application], *which* claims the benefit of German Patent Application 10160771.7 filed Dec. 11, 2001, German Patent Application 10121218.6 filed Apr. 30, 2001, and German Patent Application 10111692.6 filed Mar. 9, 2001. The disclosures of the above applications are incorporated herein by reference.

FIELD OF THE INVENTION

The invention relates to a fastening element, in particular a blind rivet, having a setting head, a deformation segment and a shank end, and to a process and device for setting the said fastening element, a punch die, the riveted connection made by the process and/or device, and an employment of said riveted connection.

BACKGROUND OF THE INVENTION

Numerous types of rivets are known in the art. Blind rivets are distinguished in that the force required to set the blind rivet is not applied by force-absorbing stirrups on either side of a part to be riveted, but the head and foot of the rivet are pressed together by pulling on a mandrel passing through the interior of the blind rivet, the head being held at the part of the foot pulled towards the head by means of the mandrel.

The advantage of the blind rivet consists in that access to only one side of the work is required. Various "designs" have been developed for self-drilling blind rivets, but the creation of self-piercing blind rivets has not been considered, since the necessary deformability of the shank does not permit exertion of a piercing force.

A disadvantage of the blind rivet consists in that holes must be drilled or punched in the work in order to set the blind rivet. This is difficult especially when two parts are to be connected to each other, the parts not being movable relative to each other. Production of the holes in conjunction with orientation of the parts sometimes presents difficulties, so that the drilling and the setting of the rivet must take place in a fixed relative position of the parts. Even in the case of the self-drilling blind rivets, this problem arises, since during the drilling, two parts to be connected to each other may exhibit a small interval, and upon setting of the rivet, the two parts are shifted towards each other, so that owing to the shearing stresses, quality of the riveted connection is compromised. Besides, in the case of self-drilling blind rivets, chips are produced, which may damage the surfaces.

On the other hand, however, self-piercing rivets are known, as well as self-piercing nuts and bolts. In their case, the problem of finding a hole, or of displacement of the parts relative to each other, does not arise. A disadvantage of self-piercing nuts is that only comparatively small tensions and torques can be thus absorbed, since the nuts can be freed from the work with comparative ease. Furthermore, these rivets and nuts are usually processed in stationary installations, rendering this operation comparatively inflexible vis-à-vis changes of position.

The object of the present invention, then, is to specify a rivet element and a device, a die suited to the purpose, and a process for setting said rivet element, and/or a riveted connection and an employment of said riveted connection, whereby the disadvantages described are to be overcome. Furthermore, a fundamentally novel concept of a rivet element, a device and a process for setting a rivet element, for a riveted connection, and for an employment of said riveted connection, are to be specified.

SUMMARY OF THE INVENTION

This object is accomplished, according to the invention, by a fastening element having the features of the claims. Advantageous embodiments and modifications, that may be adopted singly or in combination with each other, are the subject of the various dependent claims.

The fastening element according to the invention, in particular for blind riveting, has a hollow shank comprising a setting head at its free end, a deformation segment to form a closure head, and a connecting segment formed inside the shank and serving to form a tension-resistant connection with a mandrel, in particular with the foot of a mandrel. The connecting segment comprises a punching edge extending substantially along the outermost periphery of the shank at the end of the shank opposed to the setting head.

Alternatively, a fastening element according to the invention, in particular for blind riveting, has a hollow shank comprising a setting head at its free end, a deformation segment to form a closure head, and a mandrel inside the shank comprising a head and a foot, the foot of the mandrel being at least tension-resistantly connected to an end of the shank opposed to the setting head. The end of the shank or the foot of the mandrel includes a punching edge extending substantially along the outermost periphery of the shank or of the foot of the mandrel. Punching forces are transmitted by the mandrel into the foot having the punching edge.

The superordinate idea of both fastening elements according to the invention consists in that the self-piercing and the drawing (to form the closure head) are combined with each other. This serves to combine advantages of a blind rivet connection with advantages of self-piercing.

The difference between this variant of the fastening element according to the invention and the variant first mentioned is that in the second variant, the mandrel is a part of the fastening element, whereas in the first variant, the mandrel is a part of the tool, in particular of the setting device. In the first variant, the mandrel can be used for additional setting operations.

The fastening element according to the invention has a hollow interior so that a mandrel can be thrust through the setting head and the deformation segment to achieve an at least tension-resistant connection of mandrel foot and shank end. With the punching edge, while the fastening element is being thrust through a part, a hole is punched in the work. Thus, of course, the punching force must be transmitted by the mandrel into the end of the shank, since the deformation segment cannot transmit such a force. By virtue of a sharp punching edge, the punching forces acting on the work are reduced. Likewise, a formation of cracks in the neighborhood of the punched hole is avoided, improving the quality of the riveted connection. The punching edge is a sharp edge, preferably substantially rectangular.

With the fastening element, a riveted connection is achieved that resembles a blind rivet connection, because the configuration of the closure head is accomplished by tensile stresses. Since bilateral access to the work is required for the punching operation, however, this does not constitute a straightforward blind riveting operation.

The deformation segment is deformed in that the shank end is drawn towards the setting head by means of the mandrel, which is introduced into the hollow shank and by means of which a tension-resistant connection with the connecting segment is made. By the deformation of the deformation segment, a closure head is formed. With the closure head, for example, two parts can be connected to each other. The deformation segment is either made of softer material than the setting head or the shank end, or else rendered more easily deformable by suitable conformation, e.g. by thinner wall thicknesses and/or openings and/or folds in the deformation segment.

As compared with a (self-)piercing rivet, a blind rivet will serve for connections capable of assuming greater tensile and shearing stresses. Besides, the piercing rivet operation requires ductile material on the die side, which also necessitates a certain minimum thickness. This is disadvantageous in the case of mixed structures. By the invention, this advantage is combined with the further advantage that no predrilled holes need be searched for, into which the fastening element is to be thrust. Furthermore, any production of chips by drilling of holes is avoided. By virtue of the self-piercing by the fastening element, the wall of the hole results in especially advantageous properties of the riveted connection with respect to the maximum allowable tensile and shearing stresses.

In one aspect of the fastening elements according to the invention, the shank and the mandrel, in particular the foot of the mandrel and the end of the shank, are releasably connectable. Advantages of a releasable connection are, among others, that parts can be fastened to the fastening element by means of the mandrel. Also, a releasable connection permits use of the mandrel as a tool for forming the closure head.

In another aspect, the shank and the mandrel, in particular the foot of the mandrel and the end of the shank, are dynamically interlockable. In a preferred aspect, the shank and the mandrel, in particular the foot of the mandrel and the end of the shank, are geometrically interlocked. For example, the geometrical connection is produced by a bayonet closure or a screw connection between the shank and the mandrel.

In an advantageous embodiment of the invention, the foot of the mandrel comprises an external thread and the end of the shank a matching internal thread into which the foot of the mandrel is screwable.

In yet another embodiment of the invention, the diameter of the foot of the mandrel is greater than or equal to the outside diameter of the end of the shank. In that case, advantageously the punching edge is formed on the foot of the mandrel. By means of a punching edge at the foot of the mandrel, a sufficiently large hole is punched out.

In still another advantageous embodiment of the invention, the mandrel comprises a weak point. What this accomplishes is that, by means of the mandrel, firstly the hole required for the riveted connection can be punched, and secondly, the mandrel can be removed after deformation of the deformation segment.

In still another embodiment of the invention, the setting head is greater in diameter than the deformation segment, the end of the shank or the foot of the mandrel. This ensures that firstly the fastening element will not be pressed too deep into or even through the work, and secondly the setting head can be held against the work without difficulty if the end of the shank is drawn towards the setting head.

Advantageously, the fastening element is made of metal, in particular steel, aluminum or an aluminum alloy.

In a preferred embodiment of the invention, the cross section of the fastening element is essentially circular. Alternatively, the cross section of the fastening element is essentially polygonal. By a non-circular shape of the cross section, an additional resistance to twisting of a riveted connection between two parts is achieved. If an internal thread of the fastening element is used for fastening accessory parts, the polygonal shape affords additional security against undesired rotation of the fastening element in the work.

The mandrel preferably comprises a head greater in diameter than the shank end. By means of the mandrel, a requisite compression for punching the fastening element can be absorbed. The fastening element receives the requisite strength through the mandrel, so that the fastening element can be punched into the work. At the enlarged head of the mandrel, the mandrel can afterwards be grasped and withdrawn in simple manner.

In one particular embodiment of the invention, the end of the shank is open. In an especially advantageous embodiment of the invention, the end of the shank is closed. A closed shank end results in a comparatively tight riveted connection, rendering leakage of gases, liquids or solids from one side of the work to the other more difficult.

A process according to the invention for setting a fastening element comprising a hollow shank having a setting head at its free end, a deformation segment to form a closure head, and a connecting segment formed inside the shank and forming a tension-resistant connection with a mandrel, in particular with the foot of a mandrel, the end of the shank opposed to the setting head being provided with a punching edge extending substantially along the outermost periphery of the shank, comprises the following steps.

The mandrel is introduced into the fastening element and a tension-resistant connection is formed between the mandrel and the shank. The punching operation with the fastening element connected with the mandrel is carried out to form a punched hole in at least one part. The shank is introduced into the punched hole so that the shank extends at least partly into the punched hole. A tension is applied at the mandrel, and the setting head is held against to form the closure head.

Alternatively, a process according to the invention is provided for setting a fastening element including a hollow shank having a setting head at its free end, a deformation segment to form a closure head, and a mandrel inside the shank, the mandrel including a head and a foot, and the foot of the mandrel being at least tension-resistantly connected to a shank end opposed to the setting head, and the shank end or the mandrel foot including a punching edge extending essentially along the outermost periphery of the shank or the foot of the mandrel, the process comprising: A punching operation is carried out with the fastening element and the mandrel to form a punched hole in at least one part. The shank is introduced into the punched hole so that the shank extends at least part way into the punched hole. A tension is applied at the mandrel, and the setting head is held against it to form the closure head.

With the aid of the mandrel, firstly the force required to punch the hole for the fastening element can be transmitted to the work, and secondly, using the mandrel, the shank end is drawn towards the setting head. If part of the deformation segment protrudes at the rear of the work, it is deformed, i.e. in particular widened, by traction on the mandrel. If the deformation segment does not protrude in the rear, but is located inside the work, the deformation segment is deformed in the interior of the work, and by its widening brings about a clamping, i.e. in particular a positive dynamic connection, between fastening element and the work.

If the shank end has an internal thread, the internal thread can be arranged in the rear of the work, leading to an enhanced tensional stability.

By means of the fastening element, a plurality of parts can be connected to each other. Since the mandrel absorbs the requisite compressions and/or tensions, there is more latitude in the dimensioning of the fastening element than in the case of the known rivets. In particular, wall thickness can be reduced and rivets can be manufactured with less consumption of material. Once the fastening element has been set and the deformation segment deformed, the mandrel can either be screwed out or forced out with the aid of a weak spot in the mandrel. The thread may be used, if desired, to attach accessories, such as for example lines, holders, fairings or housing parts. Alternatively, however, it may serve simply to accommodate a covering stopper.

The difference between the two variants of the process according to the invention for setting a fastening element consists in that the mandrel is employed as a tool for forming a closure head, in particular in that it is part of a device for setting a fastening element, whereas in the second variant the mandrel is a part of the fastening element as such.

In a special embodiment of the invention, at least two parts are connected to each other by means of the fastening element, while punching through at least one part. This means that at least one punch is performed by means of the fastening element, leading to an especially good retention of the fastening element. Any additional parts and components may be fastened to the fastening element. In particular, a plurality of parts are fixedly connected to each other by the deformation of the deformation segment.

In another embodiment of the process according to the invention, the mandrel is pressed into the work with a preassignable force and/or by a preassignable distance. To absorb the forces involved in the punching, the work is backed by a die, largely avoiding any plastic deformation of the work in the vicinity of the punched hole. The forces due to the punching are transmitted to the work by way of the mandrel. With the aid of the preassignable force, in particular by preassigning a suitable force curve and/or the preassignable distance, the properties of the riveted connection are influenced positively.

In a special embodiment of the invention, a screwed connection is formed between the mandrel and the fastening element. Depending on the process variant, the mandrel pertains to the fastening element or to the device of a setting machine. In the case of a setting machine containing a mandrel, the mandrel is introduced, e.g. screwed in, just before the setting of the fastening element, and then the fastening element is set with the aid of the mandrel. Lastly, the mandrel is removed from the set fastening element, in particular unscrewed. In particular, the connection between the mandrel and the fastening element can be released and/or produced after the forming of the closure head. That is, the fastened fastening element may for example be employed as a threaded bore for fastening of objects.

A riveted connection according to the invention is characterized by having been produced according to a process having the above features. Such riveted connections are distinguished by an especially good hole wall.

In one embodiment of the riveted connection according to the invention, the mandrel, configured as a screw, is screwed into the internal thread and projects beyond the setting head. In that case, the mandrel can be grasped in simple manner.

In a device according to the invention for setting a fastening element in at least one part, in particular for performance of the process according to the invention, preferably for setting a fastening element according to the invention, the device comprises a die, a ram containing a mandrel releasably connectable to the fastening element, and a holding tool for holding the setting head against the work, the ram and the holding tool being movable towards and away from the die independently of each other in a defined manner.

A modification of the device according to the invention for setting a fastening element in at least one part, in particular for carrying out a process according to the invention, preferably for setting a fastening element according to the invention, has a die, a ram for punching the fastening element through the at least one part, a holding tool for holding the setting head against the work, and a pulling tool for retracting the mandrel, the ram and the holding tool are movable towards and away from the die independently of each other in a defined manner.

By the relative motion between ram and die, the deformation segment is deformed, forming a closure head. Thus, also when processing at least two parts to be connected, an especially intimate contact between the two parts is achieved, and interstices avoided, so that an especially good quality of the riveted connection is obtained.

In a preferred embodiment of the invention, the mandrel comprises an external thread for making a detachable connection with the fastening element. This is especially important if the mandrel, as part of the device for setting a fastening element according to the first variant of the device according to the invention, is used again and again. If the mandrel is part of the device, the fastening element requires less material and is lighter in weight.

In another embodiment of the invention, the device according to the invention comprises a disposal passage in the die to dispose of punched parts. With the aid of the disposal passage, parts punched out are carried away from the work and safely disposed of in simple manner.

In an advantageous embodiment of the invention, the ram and the die are connected for dynamic interlock with a counterforce closure structure, also known as a C-stirrup. Through the counterforce structure, the forces occurring during punching are absorbed and a lateral displacement of the at least one part is avoided. This considerably enhances precision in the setting of the fastening element.

In another embodiment of the device according to the invention, means are present for moving and/or determining the position of the ram and/or of the holding tool, and/or force sensors to detect the forces arising in the setting of the rivet. With the aid of the position-determining means, the thickness of the part and the length of the fastening element to be set are checked. The means of motion allow a setting of the fastening element, in particular a punching and a deformation of the deformation segment. By means of the force sensors, it is checked how strongly at least two parts are pressed together, or with what force the deformation of the deformation segment takes place. Knowledge of the forces employed and a corresponding control of the means of motion with the aid of the means for determining position permit optimization of the riveted connection.

The employment according to the invention of a riveted connection according to the invention is for the releasable fastening of accessory parts, in particular lines, holders, fairings or housing parts to the work. Thus, the riveted connection according to the invention has two functions: Firstly, it permits the connection of at least two parts to each other, and secondly, it permits the fastening of accessories to the work.

The die according to the invention, having a punch opening of variable diameter for setting a fastening element in at least one part, in particular for carrying out the process according to the invention, preferably for setting the fastening element according to the invention, in particular with employment of the device according to the invention, comprises at least two segments to accommodate punching forces, said segments forming a punch opening enlargeable in diameter to accommodate a closure head of the fastening element, said segments being movable lodged in a die mount and the segments being held together by at least one spring element.

The enlargeable punch opening provides adequate space for forming a closure head during the traction on the mandrel, backed up by the setting head. The closure head presses the segment radially outward, so that the punch opening is independently enlarged in diameter.

Owing to its property of being enlargeable, the die may be employed, after the punching operation, when the closure head is formed, as a stop for the work. In particular, the die need not be removed after the punching operation to make room for the closure head. This is especially important when a plurality of parts are to be connected to each other and it is to be ensured that the parts do not shift against each other. With the aid of the die according to the invention, it is possible, during the entire operation of setting the fastening element, to keep two parts to be connected to each other under constant pressure, thereby improving the hole walls of the riveted connection.

Owing to the mobility of the segments, the die becomes floating, that is, upon lateral displacement of fastening element and die, e.g. because of an opening of the C-stirrup or tolerances in the fastening element, no scarring or scraping will occur on the periphery of the fastening element. Furthermore, the fastening element is more effectively protected from corrosion and the die from wear.

By means of the spring element, the segments are held together, so that after completion of an operation of setting the fastening element, the segments automatically return to their original position. This returns the die according to the invention to its original state.

The segments are so formed that they firstly are able to absorb great forces in the punching direction without becoming laterally unstable and e.g. slipping away, but in the second place, can be opened in simple manner by radial forces directed away from the punch opening and generated by the forming of a closure head.

In one embodiment of the die according to the invention, the segments are radially displaceable. A radial displacement of the segments effects an especially easy opening of the die. Alternatively, the segments are so formed, or so mounted on an axis, that the segments execute a rotary or tilting motion.

In an advantageous modification of the die according to the invention, the segments comprise a substantially plane bearing surface and the die mount a substantially plane matching surface for transmitting the punching forces to the die mount. Owing to the plane surfaces, great punching forces can be absorbed by the segments and transmitted to the die mount, ensuring a stable lodgment of the segments in the punching operation.

In a preferred embodiment of the die according to the invention, the segments comprise receptacles for spring elements. A spring element is guided in the receptacles. This makes it possible for the segments, after completion of a setting operation, to return into their original position and be available for another setting operation.

Advantageously, the die according to the invention comprises a die mount containing an annular stop. With the aid of the annular stop, the part to be fastened is firmly held during the setting operation, in particular ensuring that any lateral motion of the work is avoided. The annular stop prevents lateral displacement of the segment. The annular stop thus effects a secure retention of the object during the setting operation.

In a preferred embodiment of the die according to the invention, the annular stop for ensuring mobility of the segments during the operation of setting the fastening elements comprises an annular stop surface and the segments comprise a segment stop surface, the segment stop surface being located, in relation to the work, at a distance from 0.1 to 0.3 mm, preferably from 0.15 to 0.25 mm, behind the annular stop surface. Owing to such an arrangement of the stop surfaces, the annular stop of the die mount is arranged closer to the work than the segment. The result of this is that the work is securely held by the annular stop and that any slippage of the work during the punching operation or the riveting operation is prevented. Thus, the segments are able to move radially (floating) even in pre-stressed condition of the work.

In a special embodiment of the die according to the invention, the die comprises less than 5, in particular 4, and preferably 3 segments. In another special embodiment of the die according to the invention, the spring element is formed by a rubber ring. The spring element ensures that the movable segments, after completion of the operation of setting a fastening element, are automatically shifted back into their original position.

In an alternative special embodiment of the die according to the invention, the spring element is a spiral ring.

Advantageously, the die according to the invention comprises a transverse vent hole with which punched-out parts can be removed through a disposal passage by means of compressed air.

To prevent a rotation of the fastening element relative to the work, or a rotation of two parts relative to each other, the punch opening formed by the segments is rotationally asymmetrical in cross-section. Advantageously, the punch opening is substantially polygonal in cross-section. To further support a protection against rotation, the segments are provided with teeth, so that the punch opening comprises a toothing in cross-section. With the aid of the rotationally asymmetrical punch opening, a corresponding rotationally asymmetrical punched hole is formed, with which the fastening element, even if of rotationally symmetrical configuration as such, will make smooth contact during its deformation. Combining the fastening element with the rotationally asymmetrical punched hole achieves a rotationally fixed connection.

BRIEF DESCRIPTION OF THE DRAWINGS

Other special embodiments and advantages of the invention are illustrated with reference to the accompanying drawings. The drawings are to be understood as an exemplary instance of the invention, not intended to limit the invention in its spirit and significance.

DETAILED DESCRIPTION OF THE PREFERRED EMBODIMENTS

Figure 1:
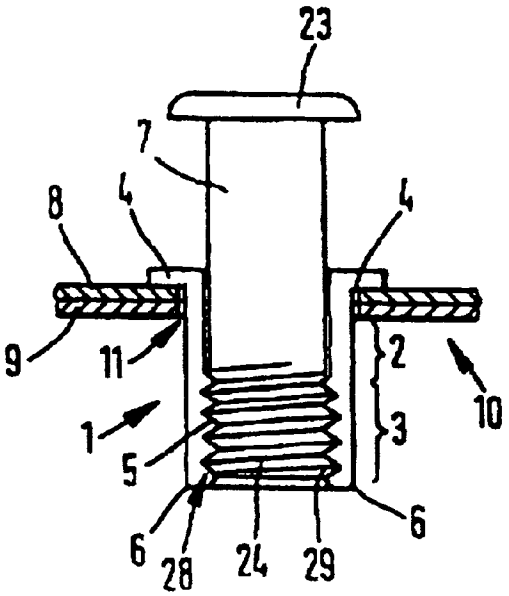
FIG. 1 is a fragmentary sectional view showing a fastening element according to the invention with a mandrel thrust into a piece of work.

FIG. 1 shows a fastening element 1 according to the invention, having a setting head 4, a deformation segment 2 and a shaft end 3 with an internal thread 5 and a punching edge 6, hollow, into which a mandrel 7 having a head 23 and a foot 24 is screwed. The tension-resistant connection between the mandrel 7 and the shank 27 is made by means of a connecting segment 28. The connecting segment 28 is made up of an internal thread 5 in the shank 27. The internal thread 5 is screwed onto an external thread 29 on the mandrel 7. The fastening element 1 is punched through a first part 8 and a second part 9, the two parts 8, 9 having the aspect of sheets lying one upon another. The fastening element 1 punches its own hole 11 through the parts 8, 9. The shank end 3 and part of the deformation segment 2 are located in the rear 10 of the second part 9. The deformation segment 2 has a thin wall thickness compared to the shank end 3. The mandrel 7 includes a head 23, to which firstly accessories 22 (not shown) can be fastened, and with which the mandrel 7 can be drawn towards the setting head 4. The setting head 4 rests firmly on the first part 8.

Figure 2:
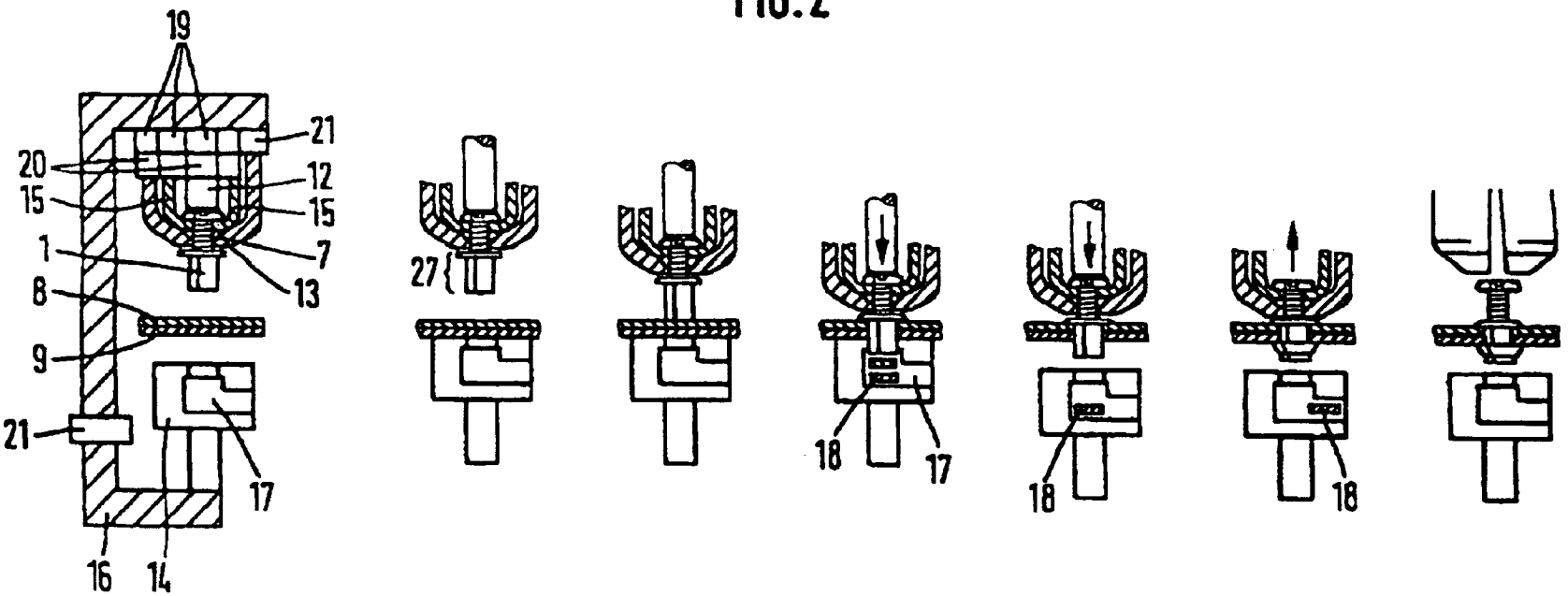
FIG. 2 is a sequenced flow diagram showing a process routine according to the invention, in which the fastening element containing a mandrel is set by a device for setting a fastening element in a part.

FIG. 2 describes a routine operation of setting a fastening element according to the invention. In the fastening element 1 according to the invention, held by a holding tool 13, a mandrel 7 is screwed in. With the aid of moving means 19, the fastening element 1 is placed on a first part 8 to be connected to a second part 9. The location of the fastening element 1 relative to the parts 8, 9 is detected with the aid of positioning means 19. The parts 8, 9 are first placed on a die 14, comprising a disposal passage 17 for punched-out parts 18. Then, the fastening element 1, with the aid of the holding tool 13, is so placed on the first part 8 that the shank end 3 of the fastening element 1 contacts the first part. Then, with the aid of a ram 12, a force is exerted on the mandrel 7 so that the shank end 3 is thrust through the parts 8, 9. Meanwhile, in the motion of the ram 12, both the holding tool 13 and a tension tool 15 are carried along. Punched-out parts 18 drop into the disposal passage 17, where they are disposed of, preferably with the aid of a positive or negative pressure line. Then, the die 14 is removed from the parts 8, 9, so that the shank end, or the protruding deformation segment, as the case may be, is freed. Next, the traction tool 15 pulls the mandrel 7, while the holding tool 13 presses the setting head against the first part 8. The traction deforms the deformation segment 2, whereas the shank end 3 is not plastically deformed. With the aid of force sensors 21, the traction and the punching are monitored, and the motion of the traction and/or holding tool is controlled according to the data detected by the force sensors 21. Finally, the mandrel 7 can be screwed out of the fastening element 1, or an accessory part can be fastened with it.

Figure 3:
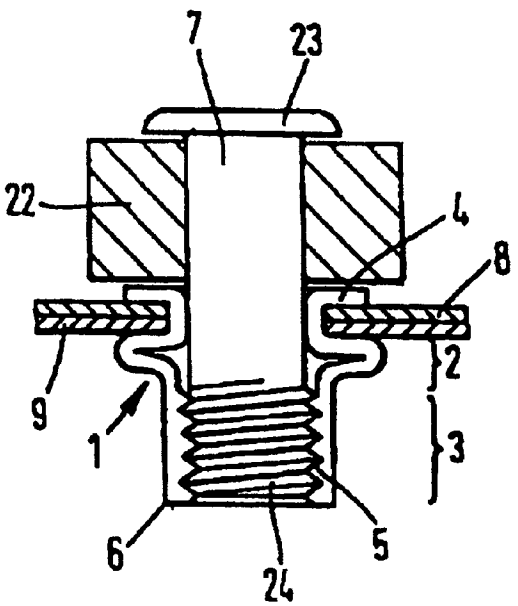
FIG. 3 is a fragmentary sectional view showing a riveted connection according to the invention, an accessory part being attached to the work by means of the mandrel.

FIG. 3 shows a riveted connection made in the manner described, the deformation segment 2 of the fastening element 1 being deformed. With the aid of the mandrel 7 and its head 23, an accessory part 22, which may be a suspension, is fastened to the parts 8, 9. The parts 8, 9 are firmly clamped between the setting head 4 and the deformation segment 2.

Figure 4:
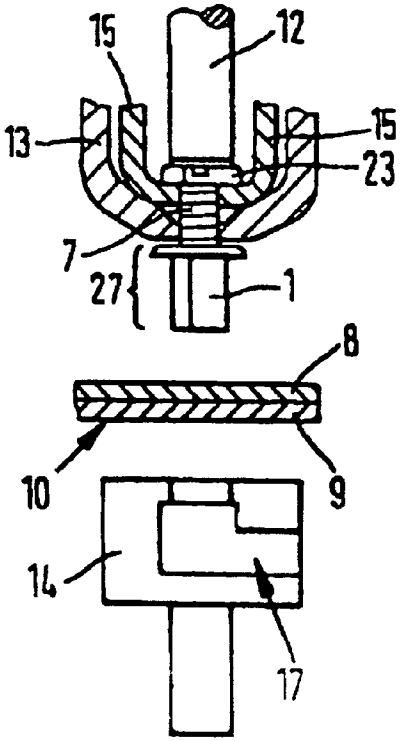
FIG. 4 is a fragmentary sectional view showing a portion of a device according to the invention for setting a fastening element with a fastening element and a part shortly before the fastening element is set.

FIG. 4 shows a detail view of the device for setting the fastening element 1. The fastening element 1 is held with the aid of the holding tool 13 on the mandrel 7 screwed into the fastening element 1. The traction tool 15 grasps the mandrel 7 by its head 23. The ram 12 presses down on the head 23 of the mandrel 7. The parts 8, 9 are arranged between the fastening element 1 and the die 14, the die 14 absorbing the force transmitted by the ram 12 by way of the mandrel 7 to the parts 8, 9 from the rear 10 of the second part 9.

Figure 5:
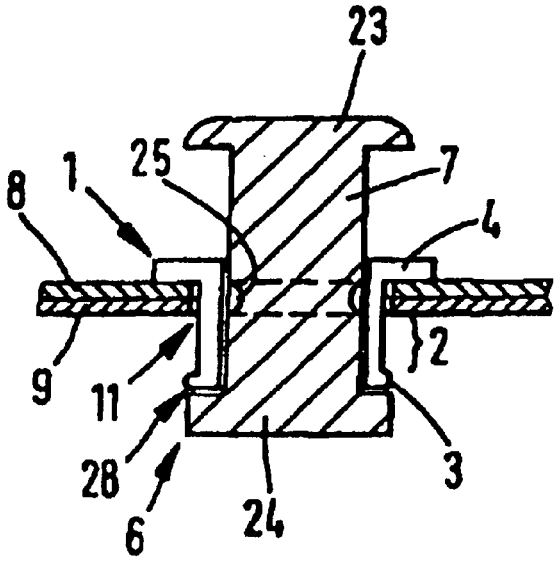
FIG. 5 is a fragmentary sectional view showing an alternative embodiment of a fastening element according to FIG. 1, having a mandrel thrust into a part.

FIG. 5 shows an alternative embodiment of the fastening element 1 according to the invention as in FIG. 1, having a mandrel 7 thrust into two parts 8, 9. The hole 11 was punched in the parts 8, 9 with the punching edge 6 formed at the foot 24 of the mandrel. With the aid of the head 23, the mandrel 7 can be retracted, so that first the deformation segment 2 is deformed, and then the head 23 of the mandrel tears off from the foot 24 at a weak point 25. The punching edge 6 is formed by a sharp, essentially rectangular edge of the foot 24 of the mandrel. The tension-resistant connection between mandrel 7 and shank 27 is made by the connecting segment 28.

Figure 6:
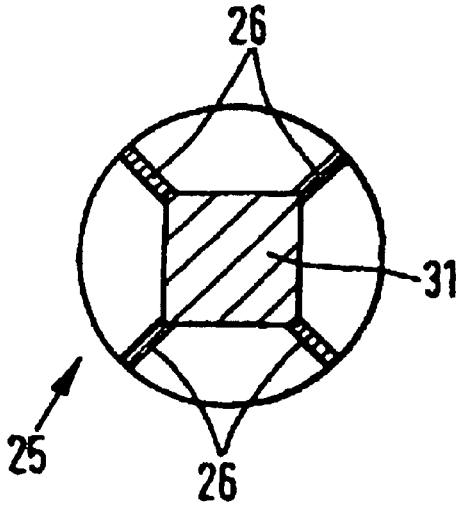
FIG. 6 is a fragmentary sectional plan view showing the weak spot of the mandrel.

FIG. 6 shows the weak spot 25 of the mandrel 7 in cross-section, where the mandrel 7 tapers down to a square core 31 with webs 26 at each corner. The webs 26 contribute to the guidance of the mandrel 7 in the fastening element 1 and prevent a lateral shearing or buckling of the mandrel 7 under the action of the compressions during the punching operation.

Figure 7:
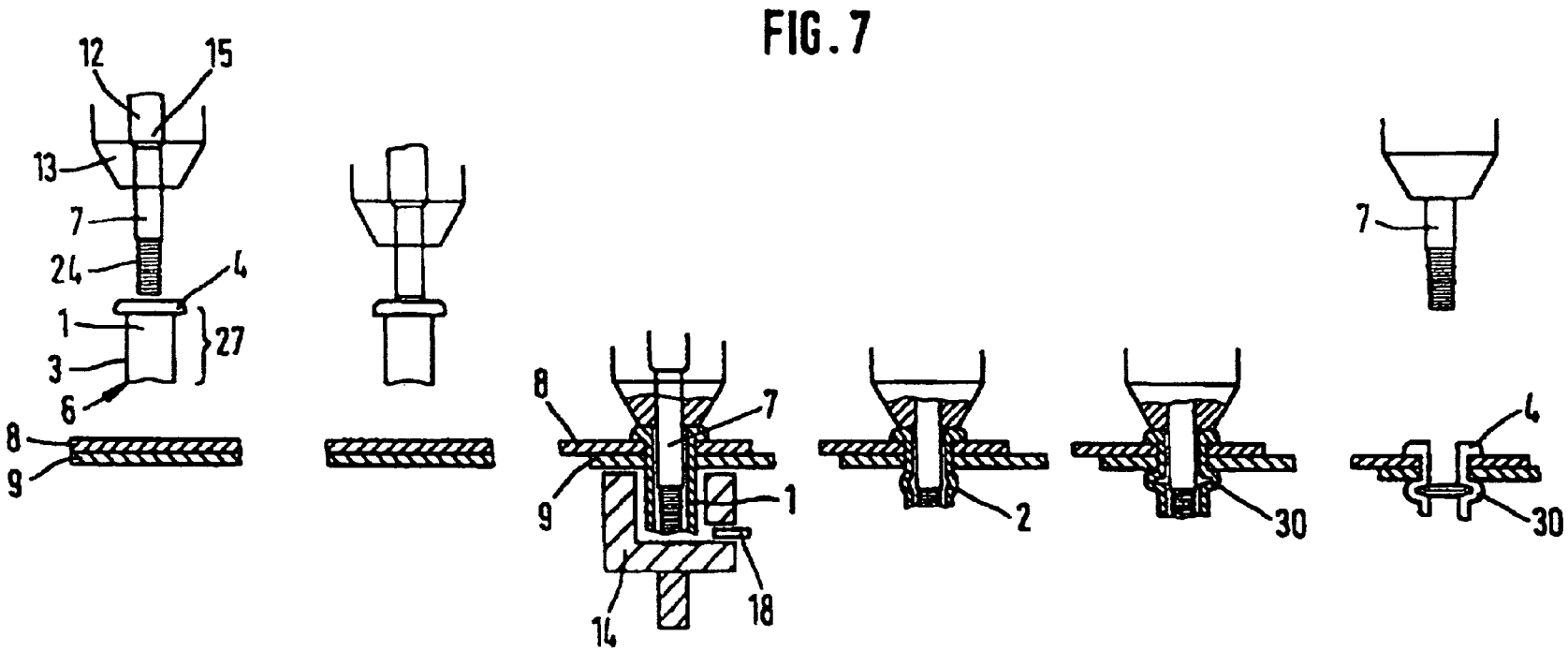
FIG. 7 is a sequenced flow diagram showing an alternative process routine according to the invention in which the fastening element is set in a part by a device for setting a fastening element comprises a mandrel.

FIG. 7 describes an alternative process routine according to the invention for setting a fastening element according to the invention. A mandrel 7 as part of the setting machine is fixedly connected to a ram 12. The mandrel 7 comprises a foot 24 by which the mandrel 7 is screwed into the fastening element 1. The fastening element 1 comprises a setting head 4 and a shank end 3, the shank end 3 being provided with a punching edge 6. First, the mandrel 7 is screwed into the fastening element 1. Then, the punching operation is carried out. Here, the punching edge 6 by dynamic action of the mandrel 7 punches a hole in the work 8, 9. Here, the die 14 absorbs the forces involved. Thereupon, by retraction of the mandrel 7 and holding down the setting head 4, the deformation segment 2 is deformed. A closure head 30 is formed. Finally, the mandrel 7 is screwed out of the fastening element 1 and is available for the next setting operation.

Figure 8:
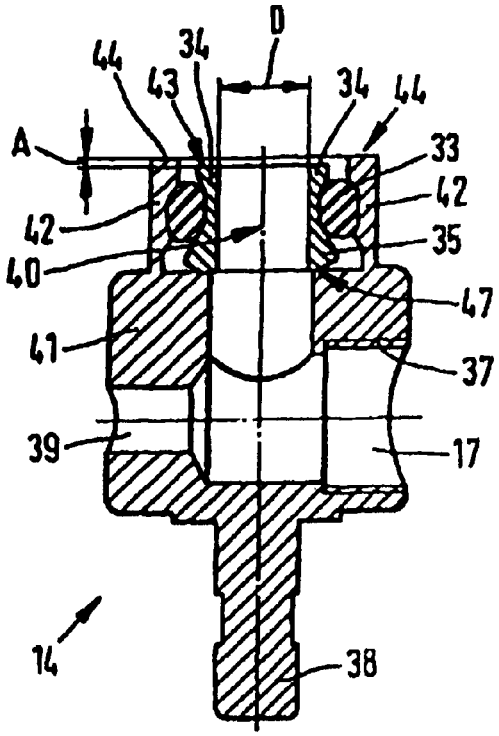
FIG. 8 is a cross-sectional view showing a die according to the invention.

FIG. 8 shows a die 14 according to the invention in cross-section. The die 14 comprises a die mount 41 absorbing the punching forces by way of movable segments 34. The movable segments 34 are held together with the aid of a spring element 33. The movable segments 34 open of their own accord when a closure head (not shown) is formed. The closure head presses the segments 34 apart against the force of the spring element 33. The segments 34 each have a bearing surface 35 resting on the die receptacle 41. The segments 34 moreover comprise a segment stop surface 43, by way of which punching forces are transmitted to the segments 34 and, by way of the bearing surface 35, to the die receptacle 41.

The die receptacle 41 contains an annular stop 42 encircling the segments 34. The annular stop 42 has an annular stop surface 44 with which a part (not shown) is held. The part is securely held by the annular stop surface 44, since the segment stop surface 43 is arranged farther away relative to the work. The distance A between the segment stop surface 43 and the annular stop surface 44 is about 0.2 mm. The segments 34 form a punch opening 40 through which a punched part (not shown) can be pressed.

With the aid of a vent hole 39 and a disposal passage 17, the punched part is removed by means of compressed air. A threaded connection 37 makes possible the simple attachment of a disposal hose (not shown) to the disposal passage 17. The die receptacle 41 is attached by means of a counter-bearing receptacle 38 to a counterforce structure, e.g. a C-stirrup (not shown).

Figure 9:
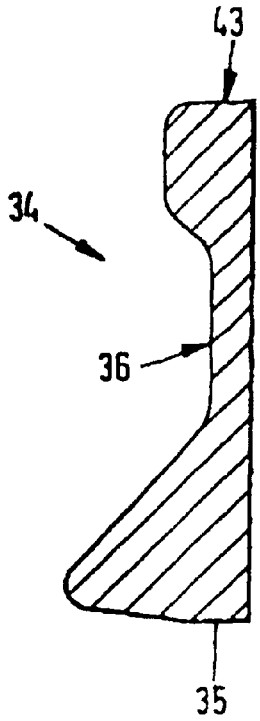
FIG. 9 is across-sectional view showing a segment of the die according to the invention as in FIG. 8, in longitudinal section.

FIG. 9 shows a single segment 34 of a die 14 according to the invention as in FIG. 8, in longitudinal section. The segment 34 comprises a segment stop surface 43 and a bearing surface 35. The bearing surface 35 is plane, so that punching forces can be safely transferred to the die receptacle 41 by way of the segment stop surface 43 and the bearing surface 35 without having the segment 34 move laterally away from the punch opening 40 radially. The segment 34 comprises a spring element receptacle 36 in which a spring element 33 is guided. The spring element 33 is fabricated as an O-ring of rubber. Owing to the aspect of the segment 34, it is not necessary to lodge the individual segment 34 with the aid of a shaft. The segment 34 may be displaced radially and not be tilted. Alternatively to this aspect, each segment 34 may be mounted with the aid of a shaft (not shown), each segment 34 being tilted about a center of rotation upon opening of the die 14.

Figure 10:
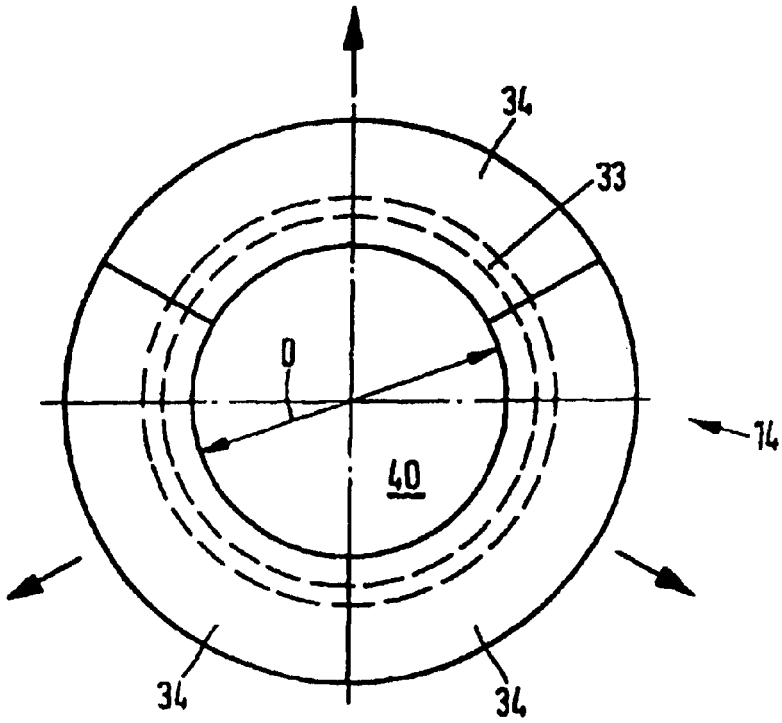
FIG. 10 is a top view showing the three segments of the die according to the invention as in FIG. 8.

FIG. 10 shows the three segments 34 of FIG. 8 in top view. It may be seen that the three segments 34 form a ring permitting the absorption of punching forces. The punch opening 40 has a diameter D somewhat greater than the diameter of the fastening element (not shown) to be set. The segments 34 are held together with the aid of a spring element 33. In the formation of a closure head at the end of the setting operation, the segments 34 are pressed apart, so that gaps form between them, enlarging the diameter D of the punch opening 40.

Figure 11:
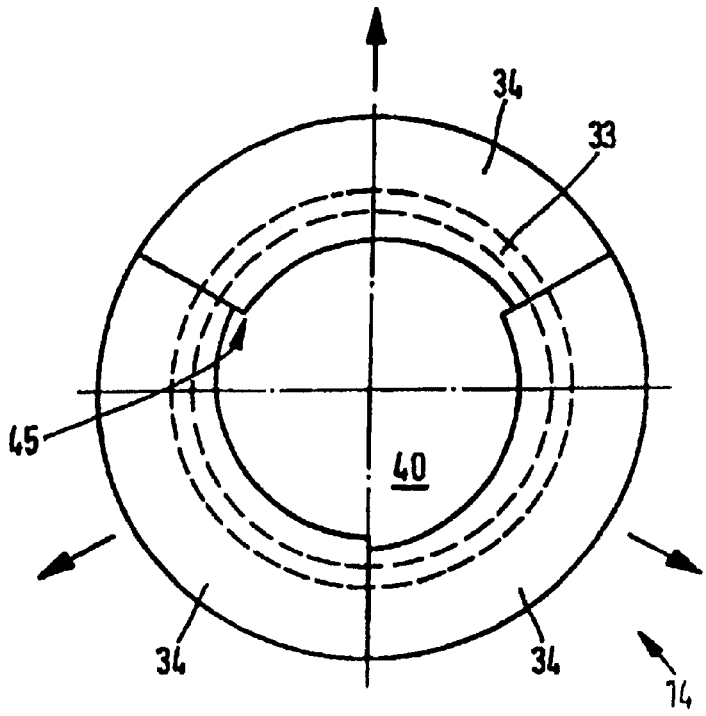
FIG. 11 is a fragmentary top view showing a die according to the invention having a rotationally asymmetrical punch opening.

FIG. 11 shows a die 14 according to the invention, having a rotationally asymmetrical punch opening 40, in top view. Here, the segments 34 form offsets 45 preventing a rotation of the fastening element 1 in the work 8, 9. This rotation protection is especially advantageous in the case of (self-) piercing nuts.

Figure 12:
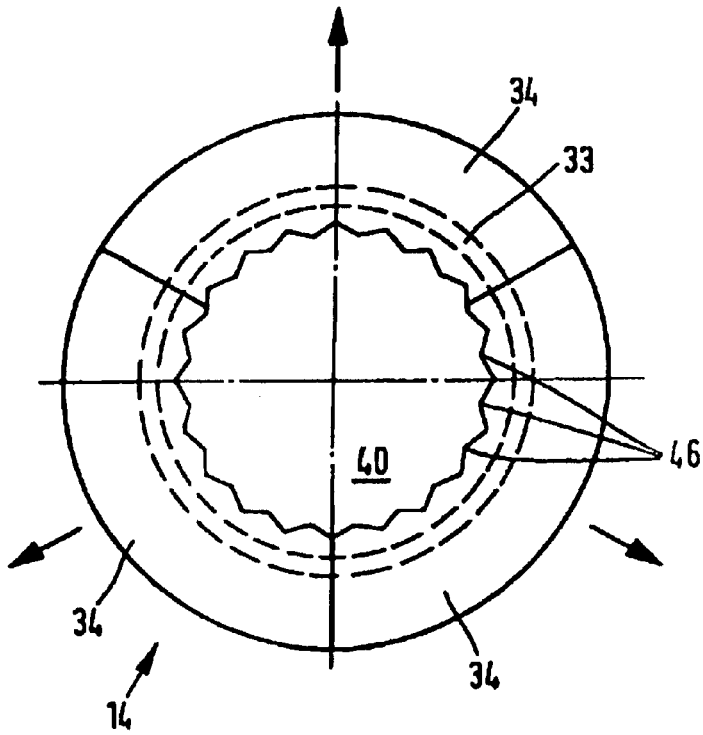
FIG. 12 is a fragmentary top view showing a die according to the invention having an additional rotationally asymmetrical punch opening.

FIG. 12 shows a die 14 according to the invention, having a wider rotationally asymmetrical punch opening 40, in top view, the rotational asymmetry being due to teeth 46 in the several segments 34. In the deformation of the fastening element 1, the periphery of the fastening element 1 makes smooth contact with the teeth 46 of the segments 34 and hence with the correspondingly toothed work 8, 9. Detachment of the die 14 from the work 8, 9 after completion of the setting operation is a simple matter owing to the mobility of the segments 34.

The invention discloses a fastening element 1, in particular for blind riveting, having a setting head 4, a deformation segment 2 and a shank end 3, the deformation segment 2 being arranged between the setting head 4 and the shank end 3, and the fastening element 1 being hollow inside, optionally with a mandrel 7 inside the fastening element 1, comprising a head 23 and a foot 24 at least tension-resistantly connected to the shank end 3, the shank end 3 or the foot 23 of the mandrel comprising a punching edge 6 extending substantially along the outermost periphery of the shank end 3, or of the foot 24 of the mandrel, and a process for setting the said fastening element 1, a riveted connection with the said fastening element 1, a device for setting the fastening element 1, an employment of the riveted connection obtained, and a die suitable for the operation of setting the fastening element.

The invention is distinguished in that, in simple manner, especially retentive and tensionally strong, self-piercing blind rivet connections can be produced, the fastening element 1 providing the possibility of attaching an accessory part 22.

What is claimed is:

1. A fastener setting system, comprising:

a fastener including:

(i) a non-frangible mandrel having a foot and an enlarged head; and (ii) a hollow shank including:

(a) a setting head at a free end;

(b) a deformation segment for forming a closure head;

(c) a connecting segment operably forming a fastenable connection with the mandrel foot; and (d) a shank end opposed to the setting head having a workpiece self-piercing edge extending substantially along an outermost periphery of the shank;

a die;

a ram detachably connectable to the mandrel and operably advancing the fastener toward the die by pushing against the head of the mandrel.

2. The system of claim 1, wherein the shank and the mandrel are positively connectably geometrically.

3. The system of claim 1, wherein the shank and the mandrel are detachably connectable.

4. The system of claim 3, wherein the shank and the mandrel are threadable connectable.

5. The system of claim 1, wherein the mandrel foot and the shank end are threadable connectable.

6. The system of claim 1, comprising:

the mandrel foot including an external thread; and the shank end including an internal thread engageable with the external thread of the mandrel foot.

7. The system of claim 1, wherein the setting head comprises a diameter greater than any one of a deformation segment diameter, a shank end diameter and a mandrel foot diameter.

8. The system of claim 1, wherein the fastener is metal.

9. The system of claim 1, wherein a cross section of the fastener is substantially circular.

10. The system of claim 1, wherein the mandrel head comprises a fastener driving element.

11. The system of claim 1, wherein the shank comprises an open end.

12. A device, comprising:

a fastening element having a setting head and a mandrel engageable into at least one part;

a die;

a ram operably punching the fastening element through the at least one part;

a holding tool operably holding the setting head against the at least one part; and a traction tool operably retracting the mandrel;

wherein the ram and the holding tool are movable relative to the die independently of each other.

13. The device of claim 12, wherein the mandrel comprises an external thread operably forming a releasable connection with the fastening element.

14. The device of claim 12, wherein the die comprises a disposal passage operably disposing each of a plurality of punched parts.

15. The device of claim 12, comprising a counterforce structure operable to dynamically interlock the ram and the die.

16. The device of claim 12, comprising at least one of:

a moving means;

a means for determining a ram position;

a means for determining a holding tool position; and at least one force sensor operably detecting a force involved in setting a rivet.

17. A fastener setting system, comprising:

a fastener including:

(i) a mandrel having a foot and a head; and (ii) a hollow shank including:

(a) an enlarged flange adjacent a first end;

(b) a deformation segment deformable to form a closure head; and (c) a connecting segment, adjacent an opposite second end, contacting with the mandrel foot a ram pushing against the head of the mandrel to operably advance the fastener; and a traction tool operably pulling the mandrel relative to the shank in order to form the closure head at the deformation segment.

18. The system of claim 17, further comprising:

the mandrel foot having a first diameter; and an outside of the second end of the shank having a second diameter;

wherein the first diameter is equal to or greater than the second diameter.

19. The system of claim 17, wherein the fastener comprises at least one of aluminum and an aluminum alloy.

20. The system of claim 17, wherein the head of the mandrel is enlarged.

21. The system of claim 17, wherein the connecting segment of the shank has a thread which engages the foot of the mandrel.

22. The system of claim 17, further comprising:

a die operable to create a punch opening having a variable diameter in at least one part, the die including at least two segments operably absorbing a punching force and operably forming the punch opening capable of accommodating the closure head of the fastening element;

a die receptacle having the segments movably lodged therein; and at least one spring element operably holding the segments together.

23. The system of claim 22, wherein the segments are radially displaceable.

24. The system of claim 22, comprising:

each segment including a planar bearing surface; and the die receptacle including a substantially planar countersurface operably transmitting the punching force to the die receptacle.

25. The system of claim 22, wherein each segment comprises a spring element receptacle.

26. The system of claim 22, wherein the die receptacle comprises an annular stop.

27. The system of claim 26, further comprising:

the annular stop including an annular stop surface; and each segment including a segment stop surface;

wherein the segment stop surface is positionable behind the annular stop surface in relation to the at least one part by a distance ranging between 0.1 to 0.3 mm, the distance operably ensuring mobility of the segments during a fastening element selling operation.

28. The system of claim 27, wherein the distance ranges between 0.15 mm to 0.25 mm.

29. The system of claim 22, comprising less than five of the segments.

30. The system of claim 22, wherein the spring element comprises a rubber ring.

31. The system of claim 22, wherein the spring element comprises a spiral ring.

32. The system of claim 22, wherein the die comprises a transversely extendable vent hole.

33. The system of claim 22, wherein the punch opening formable by the segments comprises a rotationally asymmetrical cross section.

34. The system of claim 33, wherein the punch opening comprises a substantially polygonal cross section.

35. The system of claim 34, wherein the punch opening comprises a tooth when viewed in cross section.

36. A device, comprising:

a self-piercing fastening element comprising a setting head and a mandrel;

a die;

a ram operably advancing the fastening element;

a holder operably holding the setting head; and a retractor operably retracting the mandrel;

wherein the ram and the holder are movable relative to the die independently of each other in at least one operating condition.

37. The device of claim 36, wherein the die further comprises movable die segments surrounding a central passageway.

38. The device of claim 36, further comprising a force sensor.

39. The device of claim 36, wherein the mandrel includes an enlarged head.

40. The device of claim 36 further comprising a hollow shank extending from the setting head.

41. The device of claim 40, further comprising at least a second workpiece retained to a first workpiece by the shank, a portion of the setting head being disposed between the workpieces and an attached accessory.

42. The device of claim 36, wherein the mandrel is non-frangible.

43. The device of claim 36, wherein the mandrel includes a frangible stem and an enlarged head opposite the ram.

44. The device of claim 36, wherein the ram includes the mandrel and the fastening element includes an expandable shank, the mandrel being threadably engageable with the shank.

45. The device of claim 36, wherein the mandrel comprises an external thread operably forming a releasable connection with the fastening element.

46. The device of claim 36, further comprising workpieces receiving the fastening element, wherein the die comprises a disposal passage operably disposing each of a plurality of punched parts of the workpieces.

47. The device of claim 36, further comprising a counterforce structure operable to dynamically interlock the ram and the die.

48. The device of claim 36, wherein the ram directly contacts against and pushes the mandrel toward the die.

* * * * *